(12) United States Patent
Appelquist et al.

(10) Patent No.: US 9,276,976 B2
(45) Date of Patent: Mar. 1, 2016

(54) APPARATUS AND A METHOD FOR DATA STREAMING APPLICATIONS

(75) Inventors: Göran Appelquist, Ekerö (SE); Ola Bengtsson, Sundbyberg (SE); Joachim Roos, Nacka (SE)

(73) Assignee: EDGEWARE AB, Stockholm (SE)

( * ) Notice: Subject to any disclaimer, the term of this patent is extended or adjusted under 35 U.S.C. 154(b) by 1316 days.

(21) Appl. No.: 12/230,879

(22) Filed: Sep. 5, 2008

(65) Prior Publication Data
US 2009/0077599 A1    Mar. 19, 2009

Related U.S. Application Data

(60) Provisional application No. 60/935,931, filed on Sep. 6, 2007.

(30) Foreign Application Priority Data

Sep. 6, 2007    (SE) .................................... 0701995-3

(51) Int. Cl.
*H04N 7/173*    (2011.01)
*H04L 29/06*    (2006.01)
(Continued)

(52) U.S. Cl.
CPC ........ *H04L 65/4084* (2013.01); *H04N 7/17318* (2013.01); *H04N 7/17354* (2013.01); *H04N 21/222* (2013.01); *H04N 21/2225* (2013.01); *H04N 21/2393* (2013.01);
(Continued)

(58) Field of Classification Search
CPC .......... H04N 7/17318; H04N 7/17309; H04N 7/173; H04N 21/235; H04N 21/435
USPC .............. 725/91–97, 114–117, 138, 144–147
See application file for complete search history.

(56) References Cited

U.S. PATENT DOCUMENTS

| | | | |
|---|---|---|---|
| 5,898,456 A | | 4/1999 | Wahl |
| 5,956,716 A | * | 9/1999 | Kenner et al. |
| 6,774,926 B1 | * | 8/2004 | Ellis et al. ................. 348/14.01 |
| 7,441,261 B2 | * | 10/2008 | Slater et al. ..................... 725/96 |
| 8,122,477 B1 | * | 2/2012 | Stepanian ....................... 725/91 |
| 8,291,046 B2 | * | 10/2012 | Farber et al. ................. 709/219 |

(Continued)

FOREIGN PATENT DOCUMENTS

| | | |
|---|---|---|
| EP | 1 777 962 | 4/2007 |
| WO | WO 00/60861 | 10/2000 |
| WO | WO 2004/049717 | 6/2004 |

*Primary Examiner* — Jason Salce
(74) *Attorney, Agent, or Firm* — Nixon & Vanderhye P.C.

(57) ABSTRACT

The present invention relates to a streaming apparatus, and a method in a network system, comprising at least a first and a second streaming apparatus (1001, 1002) for data streaming, each being adapted to upload and store media data, comprising a plurality of media data compositions, for example representing movies and/or TV channels, the network system further comprising a plurality of user devices (11). The method comprises the first streaming apparatus (1001) receiving a plurality of streaming requests from a plurality of the user devices (11), the first streaming apparatus (1001) determining whether to stream media data compositions according to the streaming requests, sending, if the first streaming apparatus (1001) determines not to stream a media data composition, the corresponding streaming request to the second streaming apparatus (1002), the first streaming apparatus (1001) creating request information related to streaming requests received by the first streaming apparatus (1001), and the first streaming apparatus (1001) determining, based at least partly on the request information, whether to upload and store a further media data composition (Mnpq).

36 Claims, 6 Drawing Sheets

(51) Int. Cl.
*H04N 21/222* (2011.01)
*H04N 21/2225* (2011.01)
*H04N 21/239* (2011.01)
*H04N 21/24* (2011.01)
*H04N 21/61* (2011.01)
*H04L 29/08* (2006.01)

(52) U.S. Cl.
CPC ...... *H04N 21/2408* (2013.01); *H04N 21/6125* (2013.01); *H04L 67/06* (2013.01); *H04L 67/2814* (2013.01)

(56) References Cited

U.S. PATENT DOCUMENTS

| | | | |
|---|---|---|---|
| 2002/0198930 A1* | 12/2002 | Jones et al. | 709/201 |
| 2003/0093799 A1* | 5/2003 | Kauffman et al. | 725/86 |
| 2004/0103437 A1 | 5/2004 | Allegrezza et al. | |
| 2004/0133908 A1* | 7/2004 | Smith et al. | 725/31 |
| 2005/0240591 A1* | 10/2005 | Marceau et al. | 707/9 |
| 2007/0083901 A1* | 4/2007 | Bond | 725/94 |
| 2007/0250880 A1* | 10/2007 | Hainline | 725/97 |
| 2008/0091845 A1* | 4/2008 | Mills et al. | 709/246 |

* cited by examiner

APPARATUS AND A METHOD FOR DATA STREAMING APPLICATIONS

This application is claims priority to Sweden Application No. 0701995-3 filed 6 Sep. 2007, and claims the benefit of U.S. Provisional Application No. 60/935,931, filed 6 Sep. 2007, the entire contents of each of which are hereby incorporated by reference.

TECHNICAL FIELD

The invention relates to an apparatus, and a method in a network system. The network system comprises at least one network, and at least one streaming apparatus, being adapted to upload and store media data, comprising a plurality of media data compositions, for example representing movies and/or TV channels. The network system further comprises a plurality of user devices, the streaming apparatus being adapted to stream media data compositions according to streaming requests from the user devices.

BACKGROUND

Streaming is conventionally performed in a network on media data for video, TV, sound or multimedia content, and enables the playback of such data without the need to download the entire resource file in advance of playback. This means that such data has to be sent at a pace corresponding, at least on average, to the pace at which it is to be presented. In many streaming applications, users, e.g. video viewers, have display devices, e.g. television sets or personal computers, that are connectable, e.g. via an IP-network, to a server in which the media data is stored. Each user can request individually a video or a TV program stored in the server to be displayed, so that the video is displayed to the user immediately upon streaming from the server, i.e. without storage at the display device of the entire video or TV program. The stream is normally compressed or coded, for example by MPEG-2, and the display device is adapted to decode it.

It is known, for example from the patent documents U.S. Pat. No. 5,898,456, WO2004/049717A3 or WO00/60861, to distribute media data between servers in a network based on the popularity of contents in the media data, such that content with a high popularity is stored in servers that are close to the users, while content with a low popularity is stored in remote servers. Thereby, a content management unit is provided to gather information corresponding to the popularity of media contents for streaming in the network, and to manage the distribution and re-distribution of such contents in servers in the network. However, this requires a large amount of data traffic with media popularity and management information to be exchanged in the network, and such data traffic will require a large amount of the bandwidth available in the network. Also, the re-distribution of media data contents between the servers requires a relatively large amount of the bandwidth available in the network.

There is also a need to meet demands from users for a large variety of media data contents, and at the same time to keep memory capacity requirements of streaming servers within reasonable and cost effective boundaries.

There is further a need to decrease the amount of transfers of media data in a network in order to increase the efficiency in the use of the network bandwidth capacity.

SUMMARY

It is an object of the present invention to increase, in data streaming applications, the efficiency of network utilisation.

It is also an object of the present invention to increase, in data streaming applications, the efficiency in the use of bandwidth capacity.

It is a further object of the present invention to increase, in data streaming applications, the efficiency in the use of data storage capacity.

These objects are reached with a first aspect of the invention providing a method in a network system, comprising at least one network, a plurality of user devices, and at least a first and a second streaming apparatus for data streaming, each being adapted to upload, store and stream to the user devices media data, comprising a plurality of media data compositions, for example representing movies and/or TV channels, the method comprising
  the first streaming apparatus receiving a plurality of streaming requests from a plurality of the user devices,
  the first streaming apparatus determining whether to stream media data compositions according to the streaming requests,
  sending, if the first streaming apparatus determines not to stream a media data composition, the corresponding streaming request to the second streaming apparatus,
  the first streaming apparatus creating request information related to streaming requests received by the first streaming apparatus, and
  the first streaming apparatus determining, based at least partly on the request information, whether to upload and store a further media data composition.

Each of the first and second streaming apparatuses are adapted to stream media data compositions according to streaming requests from the user devices. In general, the first apparatus can be located near the user devices or more centrally in the network system. Thus, a streaming request can be received by the first streaming apparatus directly from a user device, or indirectly, for example from another streaming apparatus located closer to the user device.

The first streaming apparatus can determine not to stream a media data composition for different reasons, for example since the media data composition is not stored by the first streaming apparatus, or since the media data composition is about to be erased from the memory of the first streaming apparatus.

If the first streaming apparatus determines not to stream the media data composition, the sending of the streaming request to the second streaming apparatus can be carried out in alternative manners. For example, the first streaming apparatus can send to the user device a declination to stream the requested media data composition, and also a reference to the second streaming apparatus, whereupon the user device can send the streaming request to the second streaming apparatus according to the reference from the first streaming apparatus. As an alternative, the user device can be provided with and store such reference information before sending the streaming request to the first streaming apparatus, and use this reference information when receiving a declination from the first streaming apparatus. As a further alternative, the streaming request can be forwarded by the first streaming apparatus to the second streaming apparatus.

The streaming apparatuses can be adapted to upload the media data in any suitable manner, and from any suitable data source in the network system. Depending on the application of the streaming apparatuses, for example the type of media data compositions to be uploaded, (e.g. movies, videos, or TV channel broadcasts), such a data source can be provided in a variety of alternative forms, for example as a further streaming apparatus, a file server, or as a so called head end encoder, adapted to send by multicasting a plurality of TV channels via the network.

In addition to the request information, the determination by the first streaming apparatus whether to upload and store a further media data composition would of course normally be based partly on a storage capacity of the first streaming apparatus.

Since the first apparatus can create request information related to the streaming requests, and determine, based on the request information, whether to upload and store further media data compositions, and requests to the first streaming apparatus can be sent to the second streaming apparatus in case the corresponding media data composition is not stored by the first streaming apparatus, the first aspect of the invention provides a completely distributed management of media content. Indeed, the first aspect of the invention provides for each streaming apparatus in the network system, regardless of whether it is located near or remote from users, to decide independently the media data which it is to store and stream. Thereby, it is possible to eliminate central media content management, and data traffic in the network system with media popularity and management information, needed in known solutions. This will significantly reduce the bandwidth requirements for streaming applications in the network system.

The first aspect of the invention provides a self-adjusting mechanism for an optimal distribution in the network system, without the need for any intelligent decisions concerning popularity and storing locations for media material. Specifically, no human input is needed in the media material distribution control.

In addition, a system with streaming apparatuses according to the first aspect of the invention, with each apparatus being able to decide independently the media data which it is to store and stream, and in which system requests to one streaming apparatus can be redirected to another streaming apparatus, will be able to continue to effectively serve users in the event of one of the streaming apparatuses being temporarily put out of operation, for example due to a failure or service thereof. In other words, with the invention according to the first aspect of the invention it is possible to eliminate risks, involved with known systems with centralized management, of a failure of one single piece of equipment bringing the entire operation to a halt. Thus, a system for media data streaming that is more robust than know media data streaming systems can be provided.

Preferably, the request information comprises a plurality of values of a popularity parameter, each popularity parameter value being based on requests received by the first streaming apparatus for a certain media data composition.

Thus, the first streaming apparatus can determine, for each media data composition for which the first streaming apparatus has received a request, a popularity parameter value, for example a frequency of the streaming requests for the respective media data composition. The request information can be statistics related to the popularity parameter values, e.g. the frequencies of the streaming requests. The first aspect of the invention provides for the first streaming apparatus independently forming a basis for its decisions regarding its stored media contents, for example, whether to upload further media data compositions. The independence of the streaming apparatus, and a completely distributed management of media content, can be provided by the local popularity parameter values and the possibility to sent streaming requests to a further steaming apparatus.

Preferably, a media data storage capacity of the second streaming apparatus is larger than the media data storage capacity of the first streaming apparatus. Thereby, media data compositions not stored by the first streaming apparatus can be stored and streamed by the second streaming apparatus. This provides a possibility to locate the second streaming apparatus, in relation to the first streaming apparatus, more centrally in the network system, so as to be able to receive streaming requests from a larger amount of user devices, as compared to the first streaming apparatus. However, it should be mentioned that the first aspect of the invention is equally applicable to a system in which the first and second streaming apparatuses are located at the same distribution level in the network.

Advantageous embodiments of the method according to the first aspect of the invention are defined in the dependent claims 5-20, and described below.

The objects are also reached with the first aspect of the invention providing a streaming apparatus according to any of the claims 21-30.

The objects are also reached with a second aspect of the invention providing a method in a network system, comprising at least one network, at least one data source, and at least one streaming apparatus, the at least one streaming apparatus being adapted to upload, from at least one of the at least one data source, media data, comprising a plurality of media data compositions, for example representing movies and/or TV channels, and store it, the network system further comprising a plurality of user devices, the streaming apparatus being adapted to stream media data compositions according to streaming requests from the user devices, the method comprising
creating request information related to at least some of the streaming requests, the request information comprising a plurality of first popularity parameter values, each being based on an actual frequency of streaming requests for a respective media data composition, and
in connection to uploading a further media data composition to the at least one of the at least one streaming apparatus, replacing in the request information the first popularity parameter value of the further media data composition, with an adjusted popularity parameter value which is higher than the first popularity parameter value of the further media data composition.

It should be noted that the at least one data source can be of any suitable type, for example, another streaming apparatus, a file server, or a head end encoder. Where the network system comprises more than one data source, these can be of the same type, or include data sources of different types.

In addition to the steps mentioned above, the method according to the second aspect of the invention can involve determining, based at least partly on the request information, whether to upload and store, in at least one of the at least one streaming apparatus, a further media data composition, and determining, based at least partly on the request information, whether to erase a stored media data composition in the at least one of the at least one streaming apparatus. It should also be noted that, in conjunction with the second aspect of the invention, the steps of creating request information, determining whether to upload and store a further media data composition, determining whether to erase a stored media data composition, and replacing the first popularity parameter value of the further media data composition, can be carried out by at least one of the at least one streaming apparatus, or some other device in the network system connectable to the at least one streaming apparatus, e.g. a central management server.

In addition, it should be noted that replacing the first popularity parameter value in connection to uploading the further media data composition, means that said value is replaced as a result of the determination to upload the further media data composition, and in practice, the first popularity parameter value replacement can be initiated before, during or after the uploading procedure itself.

Replacing, in connection to uploading a further media data composition, the first popularity parameter value of the further media data composition, provides significant advantages over prior art, as explained here below.

Each first popularity parameter value can be, for example, a frequency of the streaming requests for the respective media data composition, or correspond to such a frequency, for example by being the result of multiplying said frequency by a factor. The request information can be statistics related to the popularity parameter values, e.g. the frequencies of the streaming requests. Based on the request information, a determination can be made to upload and store, in at least one of the at least one streaming apparatus, a further media data composition for which an increase in the first popularity parameter value has been determined. For example, as exemplified below, a determination to upload the media data composition can be made if it is determined that the first popularity parameter value thereof is higher than the lowest popularity parameter value in a group of such values for respective stored media data compositions. Also, based on the request information, a determination can be made, for example in order to free storage space, to erase a stored media data composition for which a decrease of the popularity parameter value has been determined. For example, as exemplified below, a determination to erase the media data composition can be made if it is determined that the popularity parameter value thereof is lower than any popularity parameter value in a group of such values for respective stored media data compositions.

However, if the first popularity parameter values for a certain media data composition fluctuates over time, there is a risk that a sequence of alternate determinations are made to upload and erase the media data composition. For example, a recently uploaded media data composition can be erased shortly after its storage, and thereafter uploaded again. Such a sequence of erasing and uploading procedures, which can be referred as a "ping-pong effect", will cause the media data composition to be transferred from the data source at every uploading procedure. This will increase traffic in the network and bandwidth occupation.

Replacing the first popularity parameter value of the further media data composition, with an adjusted popularity parameter value which is higher than the first popularity parameter value, in connection to uploading the further media data composition, will reduce the risk of the recently uploaded media data composition being erased shortly after its storage, due to a temporary decrease of the frequency of the streaming requests for the media data composition. Thereby the risk of the ping-pong effect of media data compositions being repeatedly erased and uploaded will be decreased. This will reduce traffic in the network and bandwidth occupation, thus providing an increase of the efficiency of network utilization, and of the efficiency in the use of bandwidth capacity.

Advantageous embodiments of the method according to the second aspect of the invention are defined in the dependent claims 32-36, and described below.

The objects are also reached with the second aspect of the invention providing a streaming apparatus according to claim 39.

The objects are also reached with a third aspect of the invention providing a streaming apparatus for a network system, adapted
  to upload from at least one data source media data, comprising a plurality of media data compositions, for example in the form of movies and/or TV channels,
  to store the uploaded media data compositions,
  to receive from a plurality of user devices a plurality of streaming requests, each for a specific media data composition,
  to determine whether media data compositions of the streaming requests are stored by the streaming apparatus,
  to upload, upon a determination that a media data composition of a streaming request is not stored by the streaming apparatus, the media data composition from one of the at least one data source, and
  to begin streaming, according to the streaming request, the media data composition, before the uploading of the media data composition has been completed.

The data source from which the media data composition is uploaded can be a file server or similar, adapted to store an amount of media data compositions which is considerably greater than the amount that can be stored by the streaming apparatus. Thereby, it is possible to uphold an uninterrupted media steaming service with a very large inventory of media data compositions available for the users. This can be done with the aid of a file server, which can be provided as a considerably less complex and less expensive device than the streaming apparatus.

DESCRIPTION OF THE FIGURES

Below, embodiments of the invention will be described closer with reference to the drawing, in which.

DETAILED DESCRIPTION

Figure 1:
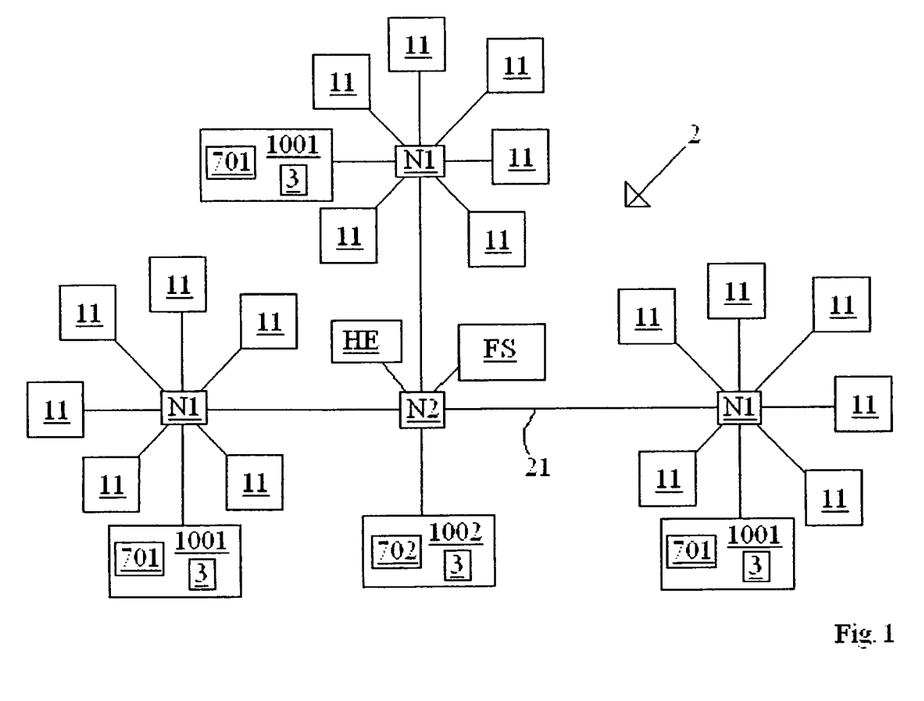
FIG. 1 shows a simplified network system for media data streaming.

FIG. 1 is a simplified depiction of a network system 2 comprising a network 21. In practice, the system could comprise any number of networks and any type, such as IP (Internet Protocol), ATM (Asynchronous Transfer Mode), or Ethernet based networks, or a network guided by any other protocol, or a combination of any of different network types.

The network system 2 comprises a number of streaming apparatuses 1001, 1002, connectable to the network each with a storage unit 701, 702 for storing media data, comprising a plurality of media data compositions, for example representing movies and/or TV channels. Each storage unit 701, 702 is accessible to a streaming unit 3 in the respective streaming apparatus 1001, 1002. The streaming units 3 are adapted to stream the media data compositions according a plurality of streaming requests from a plurality of user devices 11, also connectable to the network. Below, a brief examples are given on the operation of the streaming apparatuses.

The network comprises a plurality of nodes N1, N2, in the form of first and second nodes N1, N2. The first nodes N1 are located relatively close to the user devices 11, and the second nodes N2 are positioned more centrally in the network than the first nodes N1. FIG. 1 shows three first nodes N1 and one second node N2. First streaming apparatuses 1001 with respective first storage units 701 are connected to a respective of the first nodes N1, and a second streaming apparatus 1002 with a second storage unit 702 is connected to a second node N2. Thus, the second streaming apparatus 1002 is positioned more centrally in the network than the first streaming apparatuses 1001.

It should be mentioned that, although FIG. 1 shows a simplified network system with two levels of distribution for the streaming apparatuses, the streaming apparatuses could be provided in three or more levels of distribution. For example, the network system could present first streaming apparatuses locally distributed, second streaming apparatuses less locally located, and third streaming apparatuses located even more centrally than the second streaming apparatuses.

The network system 2 also comprises a data source in the form of a file server FS adapted to store a large amount media data. In addition, the network system 2 comprises a data source in the form of a head end encoder HE, adapted to send by multicasting a plurality of TV channels via the network.

The first streaming apparatuses 1001 are each adapted to upload media data compositions from data sources in the form of the second streaming apparatus 1002, and the head end encoder HE. The second streaming apparatus 1002 is adapted to upload media data compositions from data sources in the form of the file server FS, and the head end encoder HE. Below, examples are given on uploading procedures for the streaming apparatuses.

The media data storage capacity of the second streaming apparatus 1002 is larger than the media data storage capacity of each first streaming apparatus 1001, and the media data storage capacity of the file server FS is larger than the media data storage capacity of the second streaming apparatus 1002. In comparison to the streaming apparatuses 1001, 1002, the file server FS can store a considerably larger amount data, but it is not adapted to stream media data to user devices, and can be embodied as a less complicated and costly device compared with the streaming apparatuses. As an example, the storage capacities of each of the first streaming apparatuses 1001, the second streaming apparatus 1002, and the file server could be in the order of 500 GB (Gigabytes), 10 TB (Terabytes) and 100 TB, respectively.

Each of the first streaming apparatuses is adapted to receive a plurality of streaming requests from user devices 11. Thereby, each user device 11 is adapted to commence a streaming request session by sending such streaming requests to a first streaming apparatus 1001 located relatively near the respective user device in the network system. For example, the user device could be adapted to store a network address of a first streaming apparatus 1001 located relatively close to the user device, and use this address whenever commencing a streaming request session.

Each first streaming apparatus 1001 is adapted to, when receiving a streaming request, determine whether to stream the media data composition requested. Such a determination comprises determining whether the media data composition requested is stored by the respective first streaming apparatus 1001. If the first streaming apparatus 1001 determines that the media data composition requested is stored by the respective first streaming apparatus 1001, it might determine to stream the media data composition to the user device 11. Each first streaming apparatus 1001 is adapted to send, if the respective first streaming apparatus 1001 determines not to stream a media data composition, a message to the user device 11 with a declination of the request, and also a network address to the second streaming apparatus 1002. The user device 11 is adapted to send, upon reception of the message from the first streaming apparatus 1001, and with use of said network address, the streaming request to the second streaming apparatus 1002. The second streaming apparatus 1002 is described closer below.

It should be mentioned that, as an alternative, each first streaming apparatus 1001 can be adapted to send, upon a determination not to stream a media data composition, a message to the user device 11 with a network address to another first streaming apparatus 1001, whereupon the user device 11 sends the streaming request to the other first streaming apparatus 1001.

It should also be mentioned that the streaming request, after a declination by the first streaming apparatus 1001, can be redirected to one streaming apparatus among a plurality of streaming apparatuses. Thereby, the streaming apparatus to which the streaming request is redirected can be chosen based on the type of media data composition requested, examples of different types being different categories of movies, or TV programs.

Alternatively, or in addition, two or more of the streaming apparatuses to which streaming requests can be redirected in the manner described, can have identical media data compositions stored, and redirected requests can be sent in an alternate manner to such streaming apparatuses. Thereby, the bandwidth requirements in the network system can be distributed. In addition, such streaming apparatuses with identical media data compositions stored can provide backup for each other in the case of failure of one of them.

Figure 2:
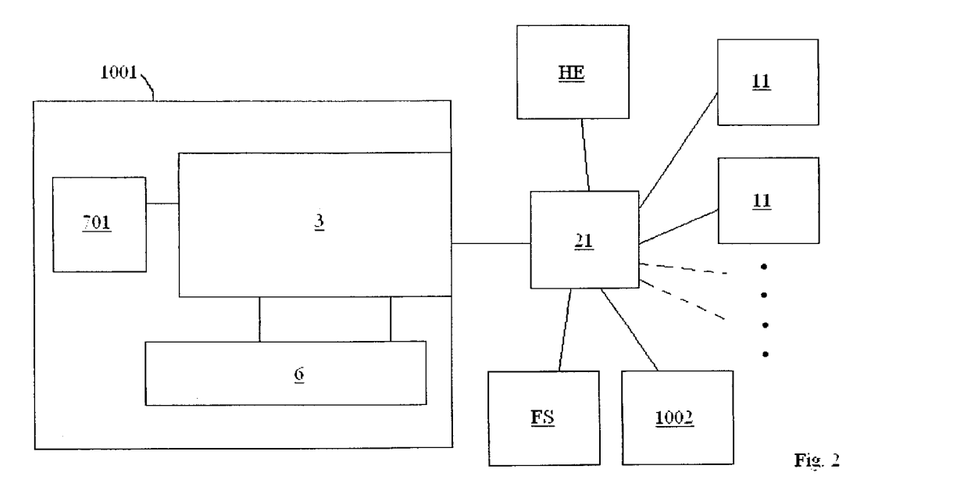
FIG. 2 shows a part of the network system in FIG. 1.

FIG. 2 depicts schematically a part of the network system in FIG. 1, with an embodiment of a first streaming apparatus 1001 with features presented in the patent applications GB0700313.0, GB0700311.4, and GB0700343.7, filed by the applicant and incorporated herein by reference. The user devices 11, connectable to first streaming apparatus via the network 21, can be any kind of remote devices adapted to receive media data, such as set-top boxes, personal video recorders, personal computers, or any combination thereof.

The storage unit 701 can comprise a solid state memory in the form of a plurality of interconnected so-called flash memory units, i.e. in-circuit programmable non-volatile memories segmented into memory sectors. The streaming unit 3 may be hard wired with two programmed logic devices in the form of a field programmable gate arrays (FPGA).

Besides the storage unit 701 and the streaming unit 3, the first streaming apparatus 1001 comprises a control unit 6, which is adapted to, during an uploading procedure, receive a media data composition from one of the data sources 1002, FS, HE mentioned above. The control unit 6 is adapted to pre-process the media data composition before being stored, whereby control data sets are created. The streaming unit 3 is adapted to stream the media data composition using the control data sets.

In a case of the first streaming apparatus 1001 uploading one or more TV channels from the head end encoder HE, this can be done in a manner described in detail in the patent application GB0708734.9 filed by the applicant and incorporated herein by reference. This can involve receiving a media data composition in the form of a TV channel broadcast, and storing the media data composition during the reception of it. During the reception of the media data composition, a plurality of full image data frames in the media data composition are detected, and control data sets for linking the full image data frames are created, and stored with the media data composition. Thereby, the media data composition in the form of a TV channel broadcast can be, as it is stored, streamed in a normal presentation mode with a minimal delay. Also, the control data sets makes trick-play modes, such as rewind, fast forward and pausing, possible for each streaming session.

A TV channel broadcast can be uploaded and saved as one media data composition. Thereby, a storage space in the storage unit 701 can be designated for the TV channel contents, and corresponding to a predetermined time interval, e.g. twelve hours, three days, or a week, during which the all TV channel contents are stored. This will involve erasing material of the TV channel as new material is stored. Such a stored TV channel broadcast can be the object of streaming requests from user devices, in the same manner as for example movies not associated with any TV channel.

As an alternative, information received by the streaming apparatus in addition to the TV channel broadcast material, and associated therewith, such as an electronic program guide (EPG), can be used to identify and store, as separate media data compositions, individual TV programs or other portions of the TV channel broadcast. Also such stored portions of the TV channel broadcast can then be the object of streaming requests from user devices, in the same manner as for example movies not associated with any TV channel.

Figure 3:
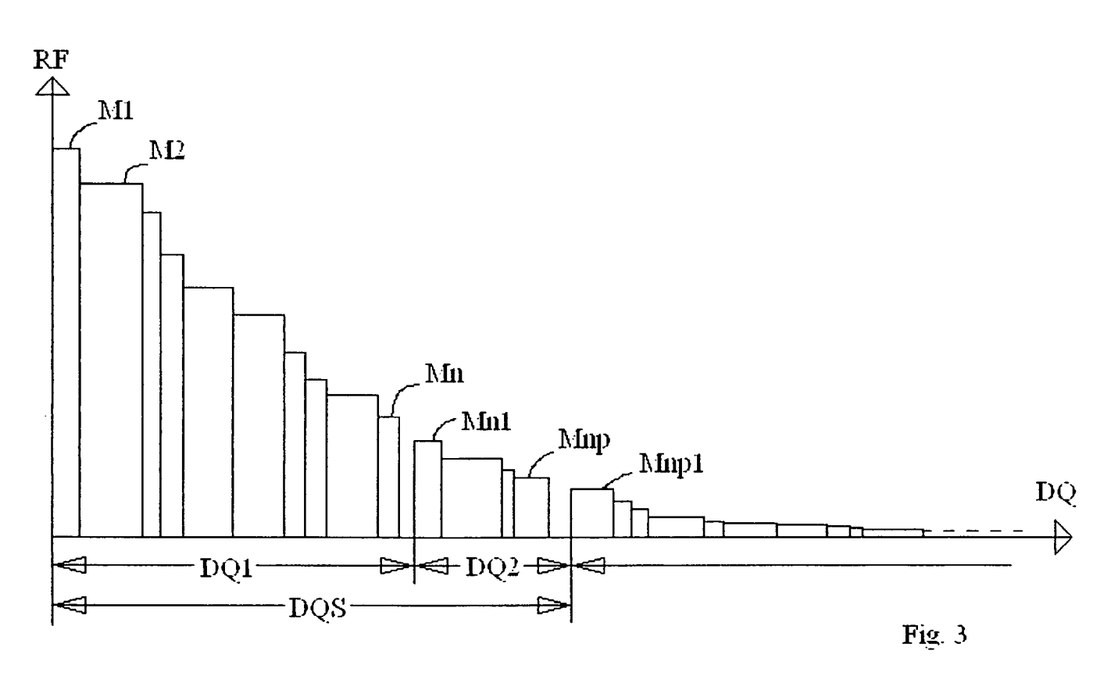
FIG. 3 shows a diagram with request information concerning streaming requests received by a streaming apparatus in the network system in FIG. 1.

Reference is made to FIG. 3. Each of the first and second streaming apparatuses 1001, 1002 is adapted to create request information related to streaming requests received by the respective streaming apparatus. More specifically, each of the first and second streaming apparatuses 1001, 1002 determines, for each media data composition that has been requested, regardless whether it is stored by the respective streaming apparatus 1001, 1002, a popularity parameter value representing a frequency of the streaming requests for the respective media data composition. The request information is statistics from which the popularity parameter values can be compared. The popularity parameter values, and therewith the request information, are continuously or periodically re-determined, i.e. updated, to follow changes in the frequencies of the streaming requests for the respective media data compositions.

FIG. 3 illustrates schematically request information created by one of the first streaming apparatuses 1001. However, the second streaming apparatus 1002 preferably also creates request information similarly to what is shown in FIG. 3. The diagram of FIG. 3 shows a number of columns, each corresponding to a specific media data composition M1, M2, Mn, Mn1, Mnp, Mnp1. The height of each column depicts the popularity parameter value RF of the respective media data composition. Intervals along the horizontal axis DQ in the diagram represent values of data quantities, and the width of each column depicts the storage size needed for storing the respective media data composition. As depicted in FIG. 3, the request information sorts the media data compositions according to their popularity parameter values RF, and in FIG. 3 popularity parameter values RF decrease along the horizontal axis DQ.

The first streaming apparatus 1001 is adapted to store a quantity of media data DQS equal to the sum of a predetermined first data quantity DQ1 and a predetermined second data quantity DQ2. In addition, the first streaming apparatus 1001 is adapted to store media data compositions, and update, by erasing and uploading procedures described closer below, the stored media data compositions such that the popularity parameter values RF of all stored media data compositions are higher than the popularity parameter values RF of the remaining media data compositions for which the first apparatus has received streaming requests.

The request frequencies of the media data composition change with time, and the popularity parameter values RF and the request information are periodically updated. If the popularity parameter value RF of a specific media data composition, not stored by the first streaming apparatus 1001, becomes relatively high, the first streaming apparatus might determine to upload it. The first streaming apparatus 1001 is adapted to rank, as indicated in FIG. 3, the stored media data compositions according to their popularity parameter values RF. The first streaming apparatus 1001 is further adapted to identify media data compositions M1-Mn within a group of media data compositions, herein referred to as a retain group. The media data compositions M1-Mn of the retain group are identified such that their total data size does not exceed the first data quantity DQ1, and such that they have popularity parameter values RF that are higher than the popularity parameter value RF for any other stored media data composition. In addition, the first streaming apparatus 1001 is further adapted to identify media data compositions Mn1-Mnp within another group of media data compositions, herein referred to as a liquidation group. The media data compositions Mn1-Mnp of the liquidation group are identified such that their total data size does not exceed the second data quantity DQ2, and such that they have popularity parameter values RF that are lower than the popularity parameter value RF for any other stored media data composition.

Figure 4:
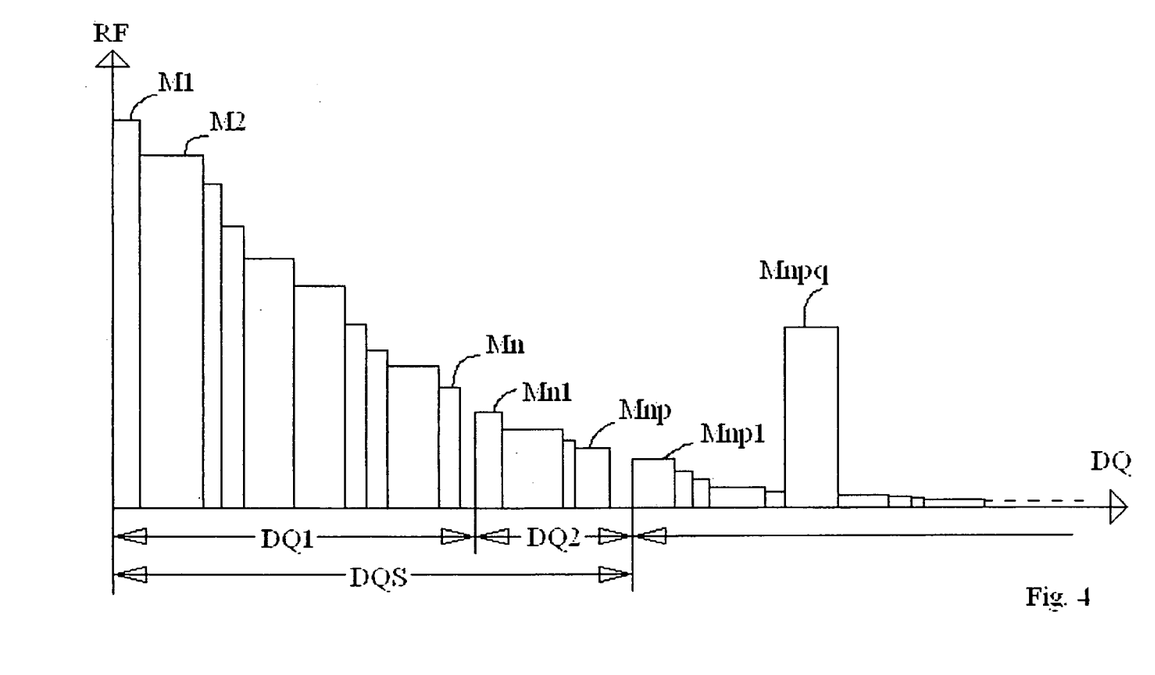
FIG. 4 shows a diagram with request information that is updated in relation to the request information in FIG. 3.

FIG. 4 illustrates request information that is updated with reference to the request information in FIG. 3. The popularity parameter value RF, i.e. the frequency of requests for the media data composition, of a media data composition Mnpq not stored by the first streaming apparatus 1001 has increased. This media data composition Mnpq is here referred to as the candidate media data composition Mnpq. If the popularity parameter value RF of this candidate media data composition Mnpq is still lower than any of the popularity parameter values RF of media data compositions Mn1-Mnp in the retain group, the first streaming apparatus will not determine to upload the candidate media data composition Mnpq. If the popularity parameter value RF of the candidate media data composition Mnpq is higher than at least one of the popularity parameter values RF of media data compositions Mn1-Mnp in the retain group, the first streaming apparatus will determine to upload the candidate media data composition Mnpq. Thereby, the popularity parameter value RF of the candidate media data composition Mnpq will be adjusted as described below.

It should be noted that alternatively, or in addition, the rate of change of the popularity parameter value RF of the candidate media data composition Mnpq can be used as a criterion for determining whether to upload the candidate media data composition Mnpq.

It should also be noted that the first streaming apparatus 1001 can be adapted to determine whether to upload the candidate media data composition Mnpq from the second streaming apparatus 1002, the file server FS, or the head end encoder HE, based on information stored by the first streaming apparatus 1001 concerning the media data composition inventory of the second streaming apparatus 1002, the file server FS, and the head end encoder HE, respectively.

In addition, or as an alternative, the first streaming apparatus 1001 can be adapted to determine, based on information concerning the type of media data composition that the candidate media data composition belongs to, the data source from which to upload it. For example, if the candidate media data composition is a movie, it might be uploaded from the second streaming apparatus 1002 or the file server FS, but if it is a TV channel broadcasting, it might be uploaded from the head end decoder HE.

Alternatively, the first streaming apparatus 1001 can be adapted to send a first uploading request to the second streaming apparatus 1002, and the second streaming apparatus 1002 can be adapted to send a declination to the first streaming apparatus 1001 if the requested media data composition is not stored in the second streaming apparatus 1002. The first streaming apparatus 1001 can be adapted to send, upon such a declination, a first uploading request for the same media data composition to the file server FS.

Preferably, the determination by a streaming apparatus 1001, 1002 whether to upload a TV channel broadcast is based on the request information comprising a popularity parameter value of the TV channel broadcast which is based on requests received by the respective streaming apparatus 1001, 1002 for the TV channel broadcast. As suggested above, the streaming apparatus 1001, 1002 can be adapted to, upon uploading the TV channel broadcast, identify portions of the TV channel broadcast, for example TV programs, and store each portion as an individual media data composition. An advantageous effect of this is that the second streaming apparatus 1002 can upload a TV channel broadcast, and store portions of the TV channel broadcast as individual media data compositions. Thereafter, the first streaming apparatus 1001 can upload one or more of said portions of the TV channel broadcast from the second streaming apparatus 1002.

It should be noted that preferably, media data compositions representing new material that has not been shown before, for example, new movies or new TV channels, are stored in data sources located centrally in the network 21. Thereafter, the self-adjusting mechanisms of the invention, with streaming apparatuses carrying out individually upload determinations based on their own request information, will allow for such new material to be distributed in the network system in an optimal manner.

Figure 5:
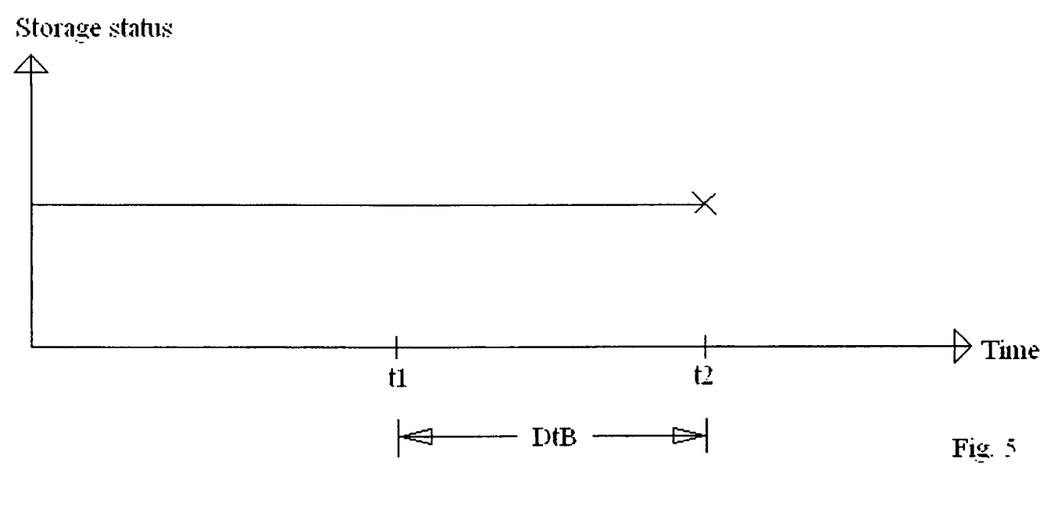
FIG. 5 shows a diagram indicating a storage status for a media data composition as a function of time.

Reference is made also to FIG. 5. Before uploading a media data composition, some storage space in the storage unit 701 of the first streaming apparatus might have to be freed. The first streaming apparatus 1001 repeatedly identifies one or more media data composition that is to be removed from its storage unit 701. This includes identifying the media data compositions Mn1-Mnp of the liquidation group, as described above. In addition, the first streaming apparatus is adapted to decline all streaming requests for the media data compositions Mn1-Mnp.

Referring to FIG. 5, the first streaming apparatus 1001 is adapted to determine, for each of the media data compositions Mn1-Mnp of the liquidation group, a buffering time period DtB. The respective buffering time period starts at a point in time t1 from which further streaming requests for the respective media data composition Mn1-Mnp in the liquidation group will be declined. Each buffering time period DtB is adapted for the respective media data composition so that no "normal" streaming sessions will be interrupted by the media data composition being erased from the storage unit 701. Excluded from "normal" streaming sessions are sessions that include extraordinary user requests, such as very long pausing of a movie represented by the media data composition. As an alternative, the same buffering time period DtB can be used for all media data compositions Mn1-Mnp in the liquidation group. At the end of the respective buffering time period DtB, the respective media data composition Mn1-Mnp is erased from the storage unit 701.

The buffering period minimized risks of streaming sessions being terminated due to the media data composition being erased.

As a further alternative, or in addition, a media data composition in the liquidation group can be erased without any buffering time period DtB, if it is determined that there is no streaming session involving the media data composition in progress, or a media data composition can be erased immediately upon a determination that there is no streaming session involving the media data composition in progress.

Preferably, the request information created by the second streaming apparatus 1002 is adjusted such that popularity parameter values of all media data compositions stored by the first streaming apparatuses 1101, or at least the popularity parameter values of media data compositions that might be erased from one of the first streaming apparatuses 1001, are adjusted so as to increase. This will secure that these media data compositions are not erased from the storage unit 702 of the second streaming apparatus 1002 during the time that streaming requests for them are accepted to the first streaming apparatuses. Information identifying such media data compositions can be sent periodically from the first streaming apparatuses 1001 to the second streaming apparatus 1002.

Where a media data composition to be erased is a TV channel broadcast, preferably the streaming apparatus is adapted to interrupt the uploading of the TV channel broadcast at a point in time determined by information received by the streaming apparatus in addition to the TV channel broadcast material, and associated therewith, such as an electronic program guide (EPG). Thereby, the interruption of the uploading can be done between two TV programs, or at an end of a days broadcasting of the TV channel. However, preferably, the interruption of the uploading of the media data composition in the form of the TV channel broadcast does not in itself affect stored media data compositions representing portions of the TV channel broadcast, such as TV programs. The determination whether to erase such portions of the TV channel broadcast can be made independently, in a manner similar to that of other stored media data compositions.

Figure 6:
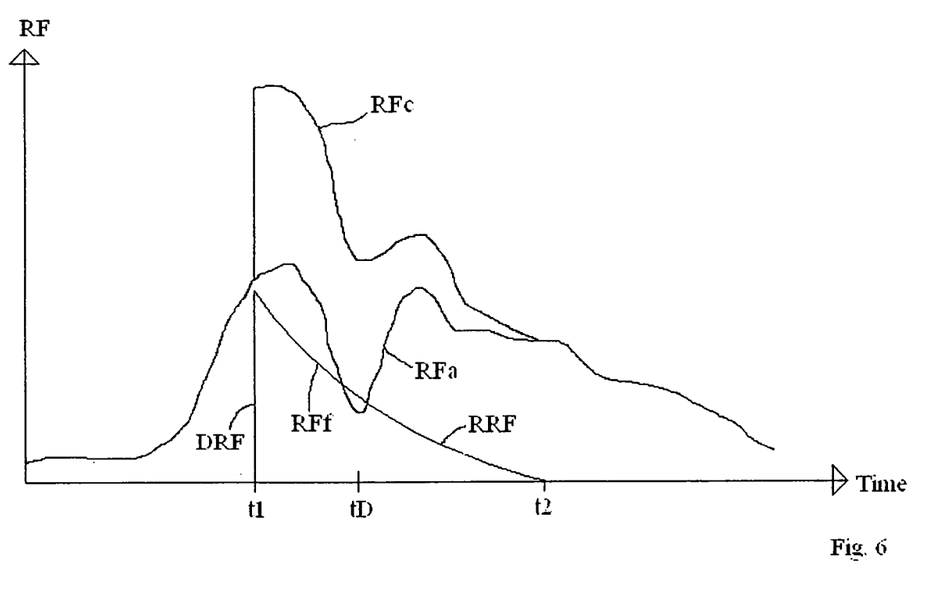
FIG. 6 shows a diagram with popularity parameter values for a media data composition as a function of time.

Reference is made to FIG. 6, showing the popularity parameter value RF of the candidate media data composition Mnpq as a function of time. The curve designated RFa depicts popularity parameter values corresponding to the actual frequency of requests for the candidate media data composition Mnpq, herein referred to as first popularity parameter values RFa. In connection to uploading, at a time designated t1, the candidate media data composition Mnpq to the first streaming apparatus 1001, the popularity parameter value RF thereof is adjusted so as to increase. This involves replacing the first popularity parameter value RFa of the candidate media data composition Mnpq, with an adjusted popularity parameter value RFc which is higher than the first popularity parameter value RFa. This is done by adding an adjustment function RFf to the first popularity parameter values RFa corresponding to the actual request frequency. The added adjustment function RFf comprises a step increment DRF, and a ramped decrease RRF.

The size of the step increment DRF is determined based on the first popularity parameter value RFa at the time t1 of uploading the candidate media data composition Mnpq. Alternatively, or in addition, the determination of the size of the step increment DRF can be done based on the rate of change of the first popularity parameter value RFa at the time t1 of the uploading. As a further alternative, the size of the step increment DRF can be a predetermined value used for all uploaded media data compositions.

The ramped decrease RRF can be determined in a variety of alternative manners. It can be linear, or non-linear as depicted in FIG. 6. If non-linear, it can for example be determined by reducing, at regular intervals, the value of the adjustment function RFf by a predetermined percentage of that value. At a time, designated t2 in FIG. 6, the adjustment function RFf reaches zero.

In FIG. 6, the adjusted popularity parameter values RFc, the result of adding the adjustment function RFf to the first popularity parameter values RFa, are shown. From the time designated t2, the adjusted popularity parameter values RFc will coincide with the first popularity parameter values RFa corresponding to the actual request frequency.

As explained above, the adjustment of popularity parameter values, as exemplified in FIG. 6, will decrease the risk of a media data composition being repetitively uploaded due to intermittent erasing of it, for example due to a temporary decrease of its first popularity parameter value RFa, as exemplified in FIG. 6 at the time designated tD.

Referring again to FIG. 1, the second streaming apparatus 1002 is, similarly to each of the first streaming apparatuses 1001, adapted to receive streaming requests, which may be sent from a user device 11 after a declination by a first streaming apparatus 1001, as described above, or forwarded by a first streaming apparatus 1001, as also mentioned above. Also, the second streaming apparatus 1002 is, similarly to each of the first streaming apparatuses 1001, adapted to determine whether the media data composition requested is stored by the second streaming apparatus 1002. If the second streaming apparatus 1002 determines that the media data composition requested is stored by the second streaming apparatus 1002, it will stream the media data composition to the user device 11.

The second streaming apparatus 1002 is adapted to send, if the second streaming apparatus 1002 determines that the media data composition requested is not stored by the second streaming apparatus 1002, a request to the file server FS for uploading the requested media data composition. Also, the second streaming apparatus 1002 will not decline the streaming request from the user device. Once the uploading procedure of the media data composition has started, and the second streaming apparatus 1002 has started storing it, the second streaming apparatus 1002 will start to stream the media data composition to the user device 11. Thus the streaming to the user device 11 is commenced before the uploading of the media data composition from the file server FS is completed.

More specifically, the simultaneous uploading and streaming of the media data composition can be carried in a manner similar to what has been described above concerning simultaneous uploading and streaming of TV channels from the head end encoder HE. However, it should be noted that the rate of data transferred when uploading the media data composition from the file server FS is preferably considerably larger than the rate of data transferred when streaming the media data composition. Thus, preferably, the bandwidth for uploading media data compositions from the file server FS to the second streaming apparatus 1002 is considerably larger than the bandwidth for streaming the media data compositions from the second streaming apparatus 1002 to the user devices 11. The uploading procedure can involve detecting a plurality of full image data frames in the media data composition, creating control data sets for linking the full image data frames, and storing the control data sets with the media data composition. Thereby, the media data composition can be, as it is stored, streamed in a normal presentation mode.

The invention claimed is:

1. A method in a network system having at least one network, a plurality of user devices, and at least a first and a second streaming apparatus for data streaming, each being adapted to upload, store and stream to the user devices media data including a plurality of media data compositions representing movies and/or content from TV channels, the method comprising:
the first streaming apparatus receiving a plurality of streaming requests from a plurality of the user devices,
the first streaming apparatus, for every one of the plurality of streaming requests, independently determining, by itself and without communication with another device in the network system, whether to stream media data compositions according to the streaming requests,
sending, if the first streaming apparatus declines the streaming request to stream the media data composition, the streaming request to the second streaming apparatus,
the first streaming apparatus creating request information related to streaming requests received by the first streaming apparatus, and
the first streaming apparatus independently determining by itself and without communication with another device in the network system, based at least partly on the request information, whether to upload and store a further media data composition, wherein
the request information comprises a plurality of first popularity parameter values, each being based on an actual frequency of streaming requests for a respective media data composition, the method further comprising,
in connection to uploading a further media data composition to the first streaming apparatus, replacing in the request information the first popularity parameter value of the further media data composition, with an adjusted popularity parameter value which is higher than the first popularity parameter value of the further media data composition.

2. A method according to claim 1, wherein the request information comprises a plurality of values of a popularity parameter, each popularity parameter value being based on requests received by the first streaming apparatus for a certain media data composition.

3. A method according to claim 1, wherein a media data storage capacity of the second streaming apparatus is larger than the media data storage capacity of the first streaming apparatus.

4. A method according to claim 1, wherein the second streaming apparatus is located, in relation to the first streaming apparatus, more centrally in the network system.

5. A method according to claim 1, wherein a plurality of user devices are adapted to send each streaming request, at least initially, to the first streaming apparatus.

6. A method according to claim 1, comprising
the second streaming apparatus creating request information related to streaming requests received by the second streaming apparatus, and
the second streaming apparatus determining, based at least partly on the request information, whether to upload and store a further media data composition.

7. A method according to claim 1, wherein, after replacing the first popularity parameter value, a difference between the adjusted popularity parameter value and the first popularity parameter value is gradually decreased.

8. A method according to claim 1, wherein the adjusted popularity parameter value is provided by adding to the first popularity parameter value an adjustment function.

9. A method according to claim 8, wherein the adjustment function comprises an increment, followed by a ramped decrease.

10. A method according to claim 9, wherein the increment is a step increment.

11. A method according to claim 9, wherein the ramped decrease is non-linear, and the rate of decrease thereof decreases gradually.

12. A method according to claim 1, comprising determining, based at least partly on the request information, whether to erase a stored media data composition in the first streaming apparatus, and, upon a determination to erase the media data composition, allowing, before erasing the media data composition, a buffering time period to lapse.

13. A method according to claim 12, comprising declining, during the buffering time period, any streaming request to the first streaming apparatus for the media data composition that is to be erased.

14. A method according to claim 1, wherein at least one of the media data compositions is a TV channel broadcast, the method further comprising the first streaming apparatus determining whether to upload and store the TV channel broadcast, based at least partly on the request information comprising a popularity parameter value of the TV channel broadcast which is based on requests received by the first streaming apparatus for the TV channel broadcast.

15. A method according to claim 14, comprising the first streaming apparatus uploading the TV channel broadcast, identifying portions of the TV channel broadcast, and storing each portion as an individual media data composition.

16. A method according to claim 15, wherein the portions of the TV channel broadcast are identified based on information associated with the TV channel broadcast and received by the first streaming apparatus.

17. A method according to claim 14, comprising determining, based at least partly on the request information, whether to discontinue to upload the TV channel broadcast.

18. A method according to claim 1, wherein at least one of the media data compositions is a TV channel broadcast, the method further comprising the second streaming apparatus uploading the TV channel broadcast, identifying portions of the TV channel broadcast, and storing each portion as an individual media data composition, the method further comprising the first streaming apparatus uploading at least one of the portions of the TV channel broadcast from the second streaming apparatus.

19. A method according to claim 1, comprising
one of the streaming apparatuses uploading, upon a determination that a media data composition of a streaming request is not stored by the streaming apparatus, the media data composition from one of at least one data source, and
the streaming apparatus beginning to stream, according to the streaming request, the media data composition, before the uploading of the media data composition has been completed.

20. A streaming apparatus for a network system having at least one network, the streaming apparatus being adapted to upload and store media data including a plurality of media data compositions representing movies and/or content from TV channels, the streaming apparatus being configured:
to receive a streaming request from a user device in the network system,
for every one of the plurality of streaming requests, to independently determine, by itself and without communication with another device in the network system, whether to stream a media data composition according to the streaming request, the streaming request being sent, if the streaming apparatus declines the streaming request to stream the media data composition, to a second streaming apparatus in the network system,
to create request information related to streaming requests received by the streaming apparatus, and
to independently determine by itself and without communication with another device in the network system, based at least partly on the request information, whether to upload and store a further media data composition,
wherein the request information comprises a plurality of first popularity parameter values, each being based on an actual frequency of streaming requests for a respective media data composition, and
wherein the streaming apparatus is configured, in connection with uploading a further media data composition, to replace in the request information the first popularity parameter value of the further media data composition, with an adjusted popularity parameter value which is higher than the first popularity parameter value of the further media data composition.

21. A streaming apparatus according to claim 20, wherein the request information comprises a plurality of values of a popularity parameter, each popularity parameter value being based on requests received by the streaming apparatus for a certain media data composition.

22. A streaming apparatus according to claim 20, adapted to determine, based at least partly on the request information, whether to erase a media data composition stored by the streaming apparatus, and to allow, upon a determination to erase the media data composition, before erasing the media data composition, a buffering time period to lapse.

23. A streaming apparatus according to claim 22, adapted to decline, during the buffering time period any streaming request for the media data composition that is to be erased.

24. A streaming apparatus according to claim 20, adapted to determine whether to upload and store a media data composition in the form of a TV channel broadcast, based at least partly on the request information comprising a popularity parameter value of the TV channel broadcast which is based on requests received by the streaming apparatus for the TV channel broadcast.

25. A streaming apparatus according to claim 24, adapted to upload the TV channel broadcast, to identify portions of the TV channel broadcast, and to store each portion as an individual media data composition.

26. A streaming apparatus according to claim 25, adapted to identify the portions of the TV channel broadcast based on information associated with the TV channel broadcast and received by the streaming apparatus.

27. A streaming apparatus according to claim 24, adapted to determine, based at least partly on the request information, whether to discontinue to upload the TV channel broadcast.

28. A streaming apparatus according to claim 20, adapted to upload, upon a determination that a media data composition of a streaming request is not stored by the streaming apparatus, the media data composition from one of at least one data source, and to begin streaming, according to the streaming request, the media data composition, before the uploading of the media data composition has been completed.

29. A method in a network system having at least one network, at least one data source, and at least one streaming apparatus, the at least one streaming apparatus being adapted to upload, from at least one of the at least one data source, media data, including a plurality of media data compositions representing movies and/or content from TV channels, and store the media data, the network system further comprising a plurality of user devices, the at least one streaming apparatus being adapted to stream media data compositions according to streaming requests from the user devices, the method comprising:

creating request information related to at least some of the streaming requests, the request information comprising a plurality of first popularity parameter values, each being based on an actual frequency of streaming requests for a respective media data composition,     in connection to uploading a further media data composition to the at least one of the at least one streaming apparatus, replacing in the request information the first popularity parameter value of the further media data composition, with an adjusted popularity parameter value which is higher than the first popularity parameter value of the further media data composition,     declining a streaming request to the at least one streaming apparatus for a media data composition that is to be erased, and     determining, based at least partly on the request information, whether to erase a stored media data composition in the at least one of the at least one streaming apparatus, and, upon a determination to erase the media data composition, allowing, before erasing the media data composition, a buffering time period to lapse, wherein the declining occurs during the buffering time period.

30. A method according to claim 29, wherein, after replacing the first popularity parameter value, a difference between the adjusted popularity parameter value and the first popularity parameter value is gradually decreased.

31. A method according to claim 29, wherein the adjusted popularity parameter value is provided by adding to the first popularity parameter value an adjustment function.

32. A method according to claim 31, wherein the adjustment function comprises an increment, followed by a ramped decrease.

33. A method according to claim 32, wherein the increment is a step increment.

34. A method according to claim 32, wherein the ramped decrease is non-linear, and the rate of decrease thereof decreases gradually.

35. A streaming apparatus for data streaming in a network system comprising at least one network, the streaming apparatus being configured:

to upload from at least one data source media data, including a plurality of media data compositions,     to store the uploaded media data,     to receive from a plurality of user devices a plurality of streaming requests, each for a specific media data composition, the streaming apparatus further being adapted     to determine whether the media data compositions of the streaming requests are stored by the streaming apparatus,     to stream according to the streaming requests media data compositions stored by the streaming apparatus, the streaming apparatus is further configured:

to create request information related to at least some of the streaming requests, the request information comprising a plurality of first popularity parameter values, each being based on an actual frequency of streaming requests for a respective media data composition,     in connection to uploading a further media data composition to the at least one of the at least one streaming apparatus, to replace in the request information the first popularity parameter value of the further media data composition, with an adjusted popularity parameter value which is higher than the first popularity parameter value of the further media data composition,     to decline a streaming request to the streaming apparatus for a media data composition that is to be erased,     to determine, based at least partly on the request information, whether to erase a media data composition stored by the streaming apparatus, and to allow, upon a determination to erase the media data composition, before erasing the media data composition, a buffering time period to lapse, and     to decline the streaming request for the media data composition that is to be erased during the buffering time period.

36. A streaming apparatus according to claim 35, configured to upload, upon a determination that a media data composition of a streaming request is not stored by the streaming apparatus, the media data composition from one of the at least one data source, and     to begin streaming, according to the streaming request, the media data composition, before the uploading of the media data composition has been completed.

\* \* \* \* \*